United States Patent [19]

Pande

[11] Patent Number: 5,138,832
[45] Date of Patent: Aug. 18, 1992

[54] SOLAR THERMAL PROPULSION ENGINE

[75] Inventor: John B. Pande, Salt Lake County, Utah

[73] Assignee: Hercules Incorporated, Wilmington, Del.

[21] Appl. No.: 585,324

[22] Filed: Sep. 18, 1990

[51] Int. Cl.$^5$ ............................................. F02K 11/00
[52] U.S. Cl. ................................... 60/203.1; 60/267; 165/907
[58] Field of Search .................... 60/200.1, 203.1, 266, 60/267; 165/185, 904, 907

[56] References Cited

U.S. PATENT DOCUMENTS

| | | |
|---|---|---|
| 3,064,418 | 11/1962 | Sanders . |
| 3,267,664 | 8/1966 | Jones et al. . |
| 3,364,951 | 1/1968 | Burne et al. ........................ 165/907 |
| 3,927,659 | 12/1975 | Blake et al. . |
| 4,036,012 | 7/1977 | Monsler . |
| 4,114,592 | 9/1978 | Winston . |
| 4,166,917 | 9/1979 | Dorfeld et al. . |
| 4,459,976 | 7/1984 | Speros ................................ 165/907 |
| 4,528,978 | 7/1985 | Robinson . |
| 4,781,018 | 11/1988 | Shoji . |
| 4,815,443 | 3/1989 | Vrolyk et al. . |
| 4,841,723 | 6/1989 | Lau et al. . |
| 4,898,234 | 2/1990 | McGovern et al. ................ 165/907 |

OTHER PUBLICATIONS

J. M. Shoji—"Potential of Advanced Solar Thermal Propulsion" pp. 30–47.
F. Kreith—"Principles of Solar Engineering" (pp. 252–256).
J. M. Shoji—"Solar Rocket Component Study" (pp. 1–25, 136–144, 238, 270–272).
J. J. Cuomo et al.—"Dendritic Tungsten for Solar Thermal Conversion".
T. H. DiStefano et al.—"The Reflectance of Dendrite-Tungsten Surfaces".
C. E. May et al.—"Stability of Refractory Compounds in Hydrogen Between 4500° and 5000° F., and their Compatibility with Tungsten".
"Reticulated Vitreous Carbon (An Exciting New Material)" (1976).
"Solar Rocket Component Study", J. M. Shoji, RI/RD84–180, Feb., 1985, pp. 26–38.
ERG, Inc., Duocel® foamed aluminum used in the structural core of light-weight composite mirrors used on astronomical telescopes and the fire control system of the "FMC Bradley Fighting Vehicle".
ERG, Inc., "Duocel® foamed aluminum used as the structure core, heat exchanger, and anti-slosh baffle in a lightweight conformal pressure tank".

Primary Examiner—Louis J. Casaregola
Attorney, Agent, or Firm—Mark D. Kuller

[57] ABSTRACT

The invention is directed to a solar thermal propulsion engine which comprises:
(a) an ogive solar collection cavity with inner and outer walls having therebetween a heat exchange medium which can pass and heat a propellant fluid, and having its highest temperature deep within the cavity, and (b) a nozzle attached to and communicating with the heat exchange medium through which the heated propellant fluid can be passed to create thrust. In addition, this invention is directed to a solar thermal propulsion engine which comprises. (a) a heat exchanger having a geometry such that it has inner and outer walls having therebetween an open cell foam heat exchange medium through which a propellant can pass with tubulence, wherein solar radiation can heat the inner wall and the open foam heat exchange medium to, in turn, heat the propellant, and (b) a nozzle attached to and communicating with the open cell foam heat exchange medium through which the heated propellant fluid can be passed to creat thrust.

In a preferred embodiment, the heat exchange medium of the ogive solar collection cavity is the open cell foam heat exchange medium. In a more preferred embodiment, such a preferred solar thermal propulsion engine further includes a paraboloid solar concentrator having the foam heat exchange medium in its walls.

20 Claims, 3 Drawing Sheets

SOLAR THERMAL PROPULSION ENGINE

This invention relates to the field of solar thermal powered rocket engine or unit, used primarily as an efficient propulsion device for orbital maneuvering or otherwise imparting velocity changes to space based vehicles.

BACKGROUND OF THE INVENTION

Space propulsion systems vary widely in both design and performance. Performance, as measured by specific impulse, determines the ratio of usable payload to propellant mass required to propel the system to its destination. High specific impulses allow greater usable payload masses, thereby allowing greater payloads of existing missions and new space missions that otherwise could not be achieved, and at potentially reduced costs.

Solar thermal propulsion systems have been proposed as means to achieve greater payload fractions. These engines can be used, for example, to boost payloads from low earth orbits to higher orbits. In such an engine, solar radiation is captured and focused by mirrors into a "black body" cavity of the unit, where the solar radiation heats a propellant, such as hydrogen. The propellant is then passed through a nozzle, creating thrust.

An early solar thermal propulsion engine, described by Sanders in U.S. Pat. No. 3,064,418, contains a pebble bed heat exchanger. The sun's rays are admitted through windows to a heat exchanger containing a pebble bed of refractory material. Propellant is heated as it passes through the heat exchanger and is passed through a converging/diverging rocket nozzle, creating thrust. Coolant propellant is passed through the chamber walls, so as to cool them below their material temperature limits and recover thermal energy to the propellant that might otherwise be lost. This solar thermal propulsion engine is complex to build and difficult to operate. Its internal cavity geometry promotes high re-radiation loss out its cavity entrance, hence giving poor thermal efficiency.

One solar thermal propulsion device uses one or more series of coiled refractory hollow metal tubes configured to form a conical or cylindrical shaped solar collection cavity, such as shown for the solar energy focusing assembly and storage unit described by Vrolyk et al in U.S. Pat. No. 4,815,443. Focused solar energy is directed into this cavity and is absorbed by the metal tubes. Hydrogen gas passing through the tubes is heated to high temperature. High temperature gas is then directed to a rocket nozzle where it is expended out of the nozzle, creating thrust. This device is complex to build and has low thermal efficiency due to the large re-radiation losses out of the cavity entrance.

Another solar thermal propulsion device, described by Shoji in "Potential of Advanced Solar Thermal Propulsion", Orbit-Raising and Maneuvering Propulsion: Research Status and Needs, Volume 89, American Institute of Aeronautics and Astronautics, Inc. (Ed. L. H. Caveny, 1984), consists of a deep solar collection cavity, equipped with an optically clear window at its entrance. Focused solar energy passes through the window and into the cavity. Hydrogen mixed with metal alkali seed particles are injected into the cavity, where solar energy is first absorbed by the seed particles and, in turn, is transferred to the hydrogen by physical contact. Heated hydrogen is then expended out of a rocket nozzle. This device has the added complexity of an optical window and separate seed particle feed system, and low thermal efficiency because the window is opaque to some incoming frequencies of sunlight. It also has large re-radiation losses out of the cavity entrance. Furthermore, when operating at high specific impulses (low hydrogen flow rates), there is inadequate hydrogen flow to actively cool the window.

An additional solar thermal propulsion device, described by Shoji in U.S. Pat. No. 4,781,018, uses the above mentioned windowed cavity with the addition of a series of porous disks. Solar energy passing through the window impinges on an optically coarse porous disk. The disk absorbs a fraction of the solor energy and passes the remaining solar energy to underlying disks located deeper within the cavity. Hydrogen enters the cavity by a series of jet vanes directed at the window for purposes of actively cooling the window. Hydrogen then flows through the porous disks, absorbing solar energy by contact and in turn cooling the disks, minimizing re-radiation losses back out the window. The porous disk concept is specific impulse-limited by the hydrogen flow requirements of actively cooling the window. Re-radiation losses through the window also increase when operating at high specific impulses, because the first porous disk cannot be adequately cooled by the resulting low hydrogen mass flow rates.

The inventor has studies the field of solar thermal propulsion engines and developed a number of novel solar thermal engine designs. One objective is to absorb solar energy efficiently, transferring it to the propellant and expending it out of a nozzle to create thrust. Another objective is to achieve high specific-impulse, on the order of 800 to 900 or more pounds-force-second/pounds-mass (1bf-sec/1bm), by maximizing final propellant temperature. Yet another objective is to have a compact heat exchanger by way of high transfer rates per unit area, promoting high efficiency and low weight. A further objective is towards simplicity, reliability, and safety through use of low number part count, state-of-the-art fabrication techniques and well characterized materials.

SUMMARY OF THE INVENTION

This invention is directed to a solar thermal propulsion engine which comprises:

(a) an ogive solar collection cavity with inner and outer walls having therebetween a heat exchange medium which can pass and heat a propellant fluid, and having its highest temperatures deep within the cavity, and (b) a nozzle attached to and communicating with the heat exchange medium through which the heated propellant fluid can be passed to create thrust.

In addition, this invention is directed to a solar thermal propulsion engine which comprises:

(a) a heat exchanger having a geometry such that it has inner and outer walls having therebetween an open cell foam heat exchange medium through which a propellant can pass with turbulence, wherein solar radiation can heat the inner wall and the open cell foam heat exchange medium to, in turn, heat the propellant, and (b) a nozzle attached to and communicating with the open cell foam heat exchange medium through which the heated propellant fluid can be passed to create thrust.

In a preferred embodiment, the heat exchange medium of the ogive solar collection cavity is the open cell foam heat exchange medium. In a more preferred embodiment, such a preferred solar thermal propulsion engine further includes a paraboloid solar concentrator having the foam heat exchange medium in its walls.

DETAILED DESCRIPTION OF THE INVENTION

This invention is useful with any propellant having high heat capacity and thermal conductivity, and low molecular weight and viscosity, which is nonreactive and can achieve a high specific impulse. Preferred are hydrogen, lithium hydride, ammonia and methane, with hydrogen being most preferred.

Figure 1:
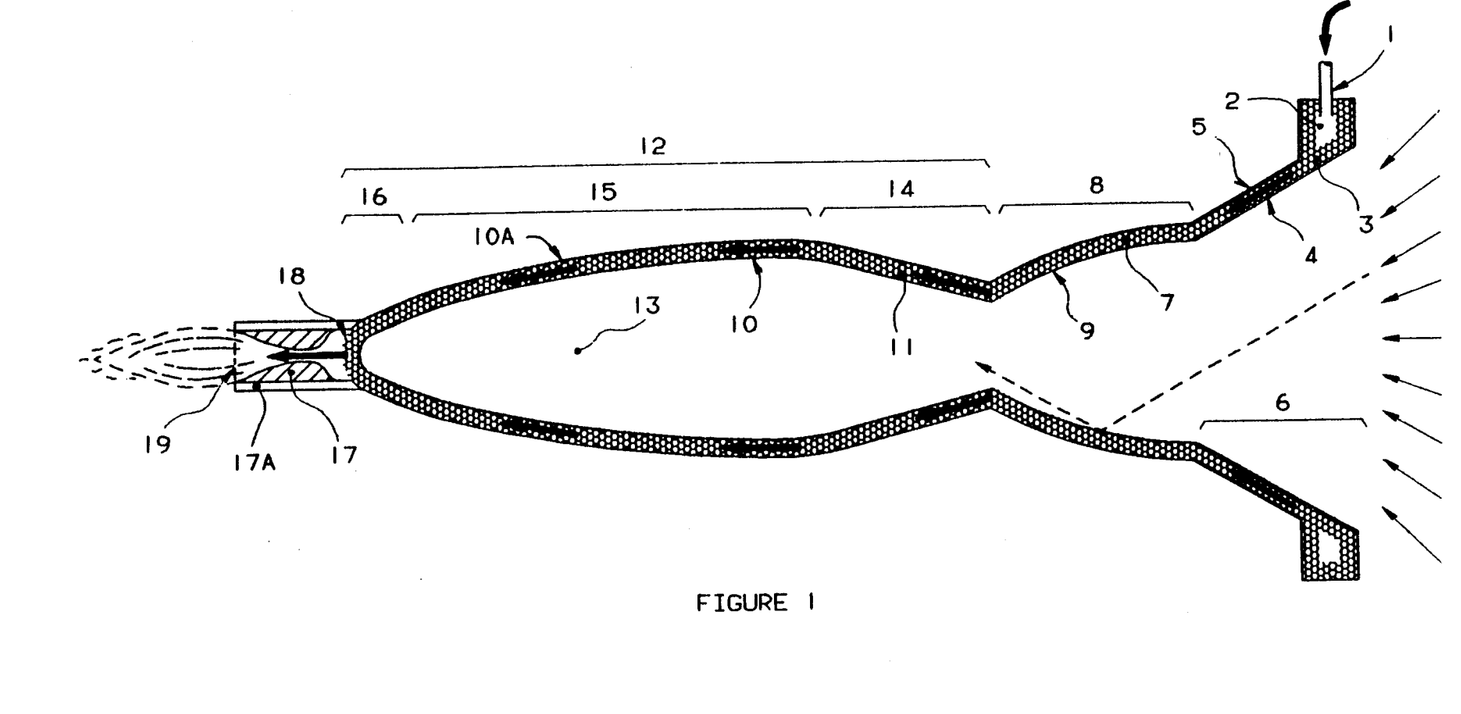
FIG. 1 is a cross-section view of a solar thermal propulsion device according to the more preferred embodiment of this invention.

FIG. 1 illustrates a solar thermal propulsion engine according to the more preferred embodiment of this invention which comprises conical section 6 through which solar radiation enters the engine, paraboloid concentrator section 8 and ogive solar collection cavity 12, all with inner and outer walls having therebetween a single-pass open cell foam heat exchange medium, and a converging/diverging rocket nozzle 17.

Propellant entering through a tube 1 empties into an annular manifold cavity 2, evenly distributing propellant about all azimuths of conical section 6 of the engine. Propellant then continues into the single-pass, open cell foam heat exchange medium 3 surrounded by inner 4 and outer 5 walls. The first section of the continuous single pass heat exchange medium that the propellant encounters is conical section 6. Focused sunlight (received from a concentrating mirror) enters the large aperture of the conical section 6 through the solar receiving end of the device. The apex angle of the conical section 6 is approximately equal to that of the apex angle of the incoming focused sunlight. Stray sunlight impinging on the conical section 6 inside wall 4 will be absorbed and subsequently raise propellant temperature. The conical section 6 is regeneratively cooled by propellant passing through the heat exchange medium 3.

Propellant travels through the conical section heat exchange medium 3 and proceeds to the paraboloid concentrator heat exchange medium 7 of the paraboloid concentrator section 8. The paraboloid concentrator inside surface 9 is optically reflective. Its inside surface contour will receive focused and diffuse solar energy through the aperture of conical section 6, concentrate it, and then pass it into the ogive cavity section 12. The paraboloid reflective surface 9 will be regeneratively cooled by propellant passing through the underlying paraboloid heat exchange medium 7. This reduces surface temperature-caused re-radiation while recovering thermal energy that is absorbed.

Propellant leaves the paraboloid concentrator heat exchange medium 7 and enters ogive cavity heat exchange medium 11, which is surrounded by walls 10 and 10A. The ogive section wall 12 encompasses the deep "trapped cavity" 13 where the majority of heat transfer of solar radiation to propellant takes place. The ogive section 12 is made up of three basic shapes connected together in sequence as follows: entrance 14, ogive 15, and closure 16. Preferably, as shown in FIG. 1, the walls are concave. In FIG. 1 the entrance shape 14 has an increasing aperture in the direction of propellant flow. However, the apex angle formed by its smallest and largest aperture can be between 0 degrees and 180 degrees for cavity optimization, depending on solar thermal energy apex angle, flux magnitude and distribution conditions entering the solar thermal propulsion device. The ogive 15 has a decreasing aperture in the direction of propellant flow and is preferably a section of a circle. It connects with the entrance aperture 14, and connects to closure 16. The closure 16 has a decreasing aperture which intersects the device's centerline, closing off the cavity.

As solar energy travels deeper into the cavity 13, inside wall temperatures increase in the direction of propellant flow due to the concentrating nature of the cavity and the decreasing regenerative cooling effect of propellant passing through the ogive heat exchange medium 11. This has the effect of boosting peak temperatures and placing the very highest wall surface temperatures as far away from the cavity entrance as possible, reducing re-radiation losses significantly. Efficiency is also greatly enhanced by the paraboloid concentrator, which effectively reduces the aperture from which radiation within the cavity 13, can escape.

Heated propellant leaving the ogive cavity heat exchange medium 11, enters the converging section of a converging/diverging rocket nozzle 17, through unsealed foam heat exchanger surface 18. Propellant gasses are expanded and accelerated through the converging/diverging nozzle 17, departing at the rocket nozzle exit plane 19 into the vacuum of space.

Figure 2:
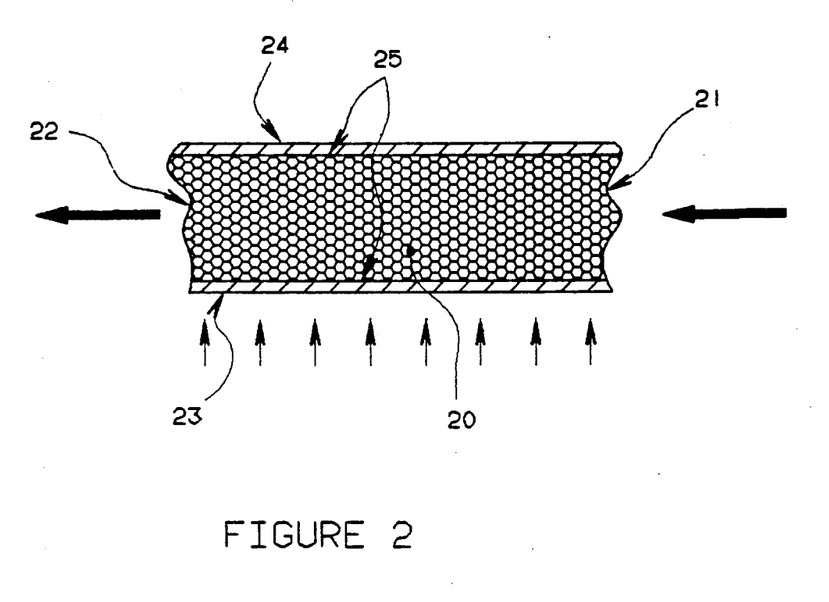
FIG. 2 is a partial schematic of the heat exchanger which forms the walls of the solar thermal propulsion device showing the foam heat exchange medium.

FIG. 2 is a partial schematic of the single pass open cell form heat exchanger found in the solar thermal propulsion device sections 6, 8 and 12. Propellant enters at 21 and leaves at 22. The high surface area-to-volume ratio open celled foam 20, provides high conductive and convective heat exchange rates per unit volume. This is especially important for propellants like hydrogen that are virtually incapable of absorbing radiant thermal energy directly. The convoluted path the propellant takes throught the open cell foam medium promotes turbulence, increasing the heat exchange rate. The foam porosity is such that it is partially transparent to light, so that the inner wall 23 radiantly transmits energy to the outer wall 24 allowing the foam structure to have near uniform temperature by means of radiant heating.

Any reticulated solid foam (which may be coated or converted) capable of withstanding the thermal and structural environments of the heat exchanger, and compatible with the propellant may be used. Exemplary are reticulated vitreous carbon (RVC) foam block, and carbide based foam such as hafnium carbide (HfC), zirconium carbide (ZrC), or tantalum carbide (TaC), or combinations thereof.

Hydrogen compromises the structural integrity of most materials at high temperatures. Therefore, when hydrogen is the propellant, RVC must be coated with rhenium (Re), hafnium carbide, zirconium carbide, or other propellant-inert material(s), or converted. RVC is converted by combining it with pure refractory materials, such as hafnium, to form a carbide. Hafnium carbide and zirconium carbide are useful without coating at temperatures below about 4840° F. and 4780° F. respectively, and should be coated with rhenium for use at higher temperatures. Tantalum carbide reacts with hydrogen at lower temperatures than those materials, and will normally need to be coated with rhenium to be used in the heat exchanger.

The entire open cell heat exchange medium can be fabricated from a single block of foam. (It may be made from more than one piece by connecting parts, e.g., using an adhesive containing foam parent material.) The foam can be machined to the geometrical contour of sections 6, 8, and 12. The foam section that forms the annular manifold cavity can be formed by internal removal of foam material (e.g., by machining) or by bonding a separate piece of foam to the foam heat exchanger by an adhesive containing foam parent material.

For the purpose off nozzle manufacture, inspection, and interchangeability with different nozzle sizes and geometries, the engine nozzle is preferably interchangeable. FIG. 1 shows an interchangeable converging-diverging nozzle 17, which may be made from a refractory material or may be made from foam coated with a refractory material. It is inserted into nozzle retainer cylinder 17A and electron-beam welded, or otherwise attached and pressure sealed at exit plane 19. The nozzle 17 and nozzle retainer cylinder 17A can be formed by machining foam and/or solid refractory materials into the desired shape. The nozzle retainer cylinder 17A may be directly attached to the heat exchanger 12 by electron-beam welding, during deposit of refractory metal, or other methods. Removal of the nozzle 17 is accomplished by grinding off or otherwise breaking the seal at exit plane 19. Orientation of the nozzle may vary, and is shown in FIG. 1 at 0 degree orientation.

In a preferred embodiment, the open cell foam medium is coated with rhenium by chemical vapor infiltration (CVI) and, then, pressure containment walls are formed from rhenium by chemical vapor deposition (CVD). Rhenium is essentially inert to a hydrogen containing propellant environment, chemically compatible to the underlying carbon or carbide foam structure, very ductile, and exhibits a high service temperature. Once assembled, the foam section is placed in a vacuum furnace. Using CVI techniques, rhenium is infiltrated throughout the foam structure, coating all surfaces. Once the foam is 100% coated, oven temperature, part temperature, and pressure are adjusted to begin the CVD process. In the CVD process, rhenium is deposited on all outer part surfaces, akin to "skinning" the part. These outer skinned surfaces form the pressure containment walls of the single-pass heat exchanger. The outer skinned walls (23 and 24 ) are integrally and mechanically attached to the foam structure by penetration into the foam outer surface 25.

An operating heat exchanger is pressurized by propellant running through it and out the nozzle. Pressurization causes mechanical stress in the foam and/or outer walls. The structure required to support mechanical stress can be achieved in one or more of the following ways: (1) the foam carries all tensile stress between the walls, while the inner and outer wall are required to provide propellant containment only; (2) a thick metal coating covering the foam carries all tensile stress, while the inner and outer walls are required to provide propellant containment only; (3) the inner and outer walls are thick and support all stresses, while the foam is not required to carry any tensile loads; or (4) some combination of (1), (2) and (3). Each section of the heat exchanger may incorporate one or more of the above mentioned methods with the emphasis on reducing overall weight, cost, complexity, and stress-creep rupture of the refractory coated surfaces and walls.

An inside rhenium surface finish can be prepared to obtain desirable surface emissivity, absorptivity and reflectivity. Sections 6, 8 and 14 perform best if they have high reflectivity and low absorptivity, while sections 15 and 16 prefer low reflectivity, high emissivity and high absorptivity. "As deposited" rhenium is typically highly reflective, requiring only minor polishing to increase its reflectivity to optimum values. Low reflective surfaces can be created by grit blasting, chemical etching and anodizing. Ion bombardment of a rhenium surface can also create hillock and dendritic surfaces that exhibit high absorptivity and high emissivity. This method is described by T. H. DiStefano et al in "The reflectance of dendritic-tungsten surfaces", J. Appl. Phys., Vol. 50, No. 6, pp. 4431-35 (1979).

Figure 3:
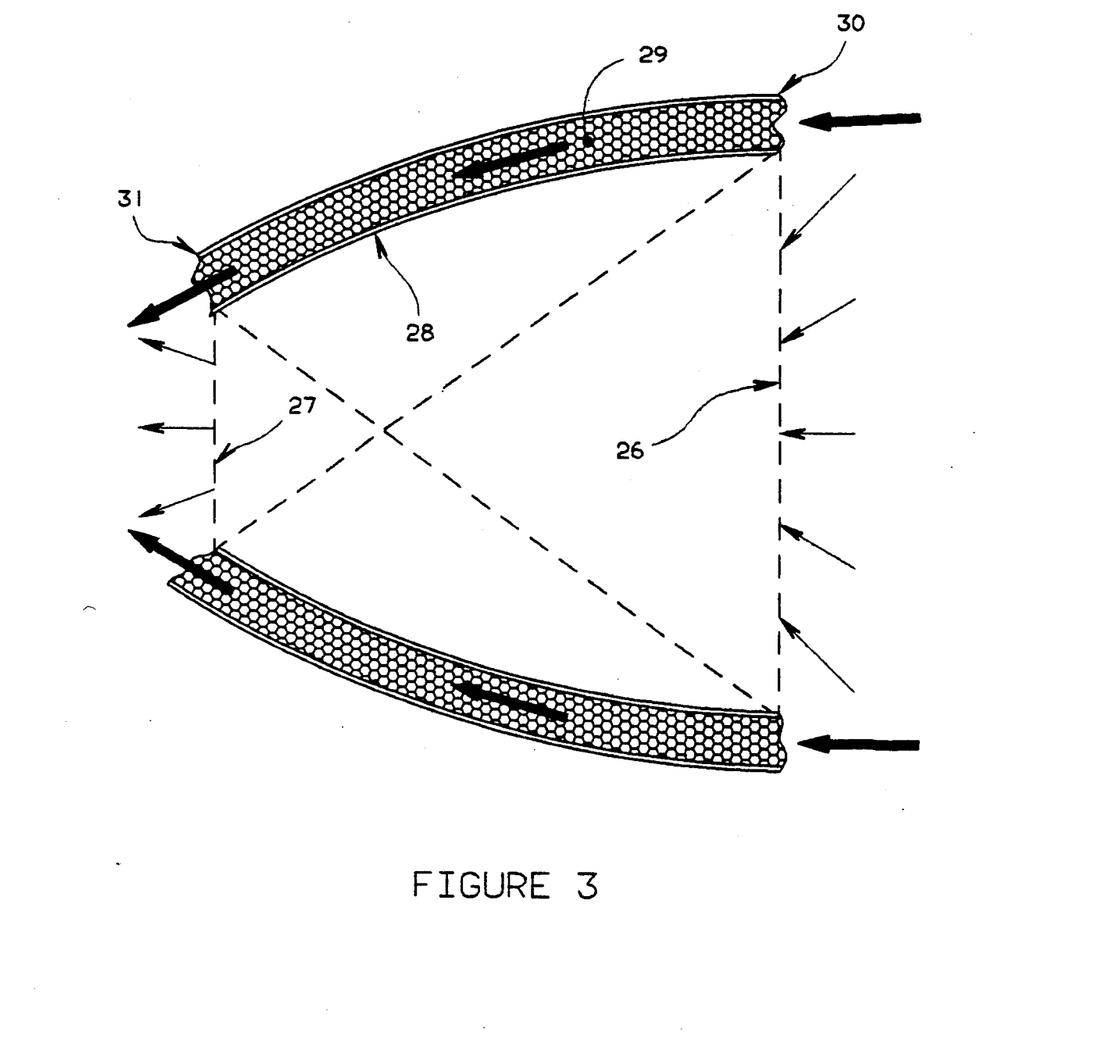
FIG. 3 is a cross-section view of the regeneratively cooled paraboloid concentrator of the more preferred embodiment.

FIG. 3 illustrates the paraboloid concentrator. The axisymmetric device accepts focused and diffuse solar energy at its largest aperture 26, concentrating and directing solar energy through the small aperture 27 and into the solar thermal propulsion device cavity. Reflective surfaced diameter walls 28 accomplish this task. Surface geometry is derived by rotating a parabolic curve about the engine centerline, forming a paraboloid; whereby the paraboloid mirrored surface will focus solar energy into a region located along the edge of the small aperture 27 plane, where it intersects the paraboloid inside wall 28. Unreflected solar radiation will pass directly into the ogive cavity 13. The paraboloid geometry is selected to accept incoming solar radiation (falling within the apex angle of the outside mirror focused beam), having no re-reflection out the large aperture 26. Regenerative cooling of the paraboloid inside wall 28 is accomplished by heat exchange medium 29. (If not cooled, surface radiation would effectively cancel benefits realized by the paraboloid concentrator.) Relatively cool propellant enters the open cell foam heat exchange medium at 30, and passes through only once before exiting at 31. Solar radiation absorbed by the inside reflective surface 28 is transferred to the propellant, thus regeneratively cooling its surface.

Not shown in the figures are propellant fluid storage means, solar collection and focusing means, insulation, radiation shields, support structure and means for preventing sublimation of the inside and outside wall of the engine cavity.

Generally, the propellant fluid will be stored in a tank compatible with the propellant and transported though pipes (also not shown) to the solar thermal propulsion engine. The tank may be attached to the engine or payload. Such a tank is shown, for example, in U.S. Pat. No. 4,781,018.

A solar collection and focusing means or "concentrating mirror" (which may be a paraboloid or spherical) collects solar radiation and focuses it on the solar thermal propulsion engine. One such device is shown in U.S. Pat. No. 4,781,018. Similar devices, such as graphite composite stiffened mirrors, are useful in this invention and are well known. Preferably, in the embodiment shown in FIG. 1, the solar radiation is focussed at a point along the engine centerline, approximately in the middle of paraboloid section 8. FIG. 3 more accurately illustrates this location, showing it as the point of intersection of the two diagonal dashed lines.

High heat insulating, low heat conducting, materials are placed outside the solar thermal engine to prevent heat loss. Reticulated vitreous carbon foam is excellent for this purose and may be coated with a material such as hafnium carbide to prevent sublimation.

Concentric metal radiation shields will surround the hosttest regions of the solar thermal propulsion engine to minimize heat loss. These are placed between the outer walls of the cavity and the foam insulation.

A support structure ties the solar thermal propulsion engine and its thermal insulation system together. Additionally, it forms an interface with or attaches the engine to the orbital transfer vehicle structure. The structure may be as simple as a light weight cylinder that encloses engine and thermal insulation system, and may be equipped with standoffs to attach it to the orbit transfer vehicle, a fuel line connector, a thrust vector control mechanism, etc.

To prevent sublimation of the heated inner wall of the cavity due to exposure to high temperature in a vacuum, the cavity is pressurized above the vapor pressure of the, e.g., rhenium. This can be done by injecting propellant from the cavity wall or pumping propellant from the hydrogen storage unit into the cavity. It is also possible to collect nozzle expansion (Prandtl-Meyer) gasses leaving the nozzle exit plane that have turned 90 degrees or more relative to the engine centerline. These gases do not contribute to deliverable specific impulse. By means of a scroll (donut shaped collection cavity with an annular inlet slit) located just outboard of the nozzle exit plane 19, these gasses can be collected and directed (using piping) inside the cavity, slightly pressurizing the local atmosphere to prevent sublimation.

There are oftern small gaps between the outer cavity wall and inermost radiation shield, and outermost radiation shield and insulation. The outer cavity wall and the insulation adjacent to the outer cavityu wall are at nearly the same temperature as the inner cavity wall, and, therefore, it is desirable to pressurize the gaps by the outer wall and the insulation to prevent sublimation. This can be done by encasing the outer wall, radiation shields and insulation, and pressurizing the volume contained therein with propellant.

The solar thermal engine of FIG. 1 is relatively small for its thermal capacity. An engine approximately 1.5 feet in length has sufficient heat exchanger area to absorb 50 or more kilowatts of thermal solar power, and convert it to kinetic energy in the form of rocket thrust. Such a device could propel an orbital transfer vehicle from a low earth orbit (ca. 125 miles altitudee to geostationary circular orbit (ca. 22,230 mile altitude) in about two weeks, delivering a payload (such as a communication satellite) mass about equal to half the low earth orbit total vehicle starting mass (including propellant). For instance, a ca. 450 pound payload and ca. 100 pounds of inerts (transfer vehicle, engine, tank, etc.) can be so propelled using ca. 450 pounds of propellant.

Tracking the sun with a parabolic mirror, independent of the orbital transfer vehicle orientation, while constantly directing solar energy into the cavity entrace is very challenging if the solar thermal propulsion engine is rigidly positioned at the mirror focus. Preferably, the engine is free to translate in three orthogonal coordinate planes (X, Y, Z) as well as rotate about these coordinate axes. Translation allows the engine cavity entrace to always be correctly positioned at the mirror focus, mitigating loss of solar energy due to pointing errors of the mirror. Rotation of the engine serves as a thrust vector system to impart pitch and yaw maneuvers on the orbital transfer vehicle.

Two or moe such thermal propulsion engines may be used in combination, with nozzles at appropriate angles. The combination of two or more side by side solar thermal propulsion engines, being supplied by separate concentrating mirrors, will allow roll maneuvers.

While the invention has been described with respect to specific embodiments, it should be understood that they are not intended to be limiting and that many variations and modifications are possible without departing from the scope and spirit of this invention.

What is claimed is:

1. A solar thermal propulsion engine which can receive solar radiation, pass and heat a propellant fluid using the solar radiation, and creates thrust which comprises:
    (a) a paraboloid solar concentrator having inner and outer walls having therebetween a heat exchange medium which can pass and heat a propellant fluid, the inner wall being a reflective paraboloid surface which can reflect and further focus incoming solar radiation within the cavity, the paraboloid solar concentrator having its largest aperture at the solar radiation receiving end,
    (b) attached to the small aperture end of the paraboloid solar concentrator, an ogive solar collection cavity with concave inner and outer walls having therebetween a heat exchange medium which can pass and heat a propellant fluid, having its highest temperatures deep within the cavity, and
    (c) a nozzle attached to and communicating with the heat exchange medium of the ogive solar collection cavity, through which the heated propellant fluid can be passed to create thrust;
    wherein the inner wall of the solar collection cavity, and the paraboloid solar concentrator can be regeneratively cooled by the propellant.

2. A solar thermal propulsion engine as claimed in claim 1 wherein the heat exchange medium of the oqive sollar collection cavity is a single-pass, open cell foam through which the propellant can pass with turbulence, wherein solar radiation can heat the inner wall of the ogive solar collection cavity and the open cell foam heat exchange medium to, in turn, heat the propellant.

3. A solar thermal propulsion engine as claimed in claim 1 wherein both the ogive solar collection cavity and the paraboloid solar concentrator have inner and outer walls having therebetween a single-pass, open cell foam heat exchange medium through which the propellant can pass with turbulence, wherein solar radiation can heat the inner wall of the ogive solar collection cavity and the paraboloid solar concentrator, and the open cell foam heat exchange medium to, in turn, heat the propellant.

4. A solar thermal propulsion engine which can receive solar radiation, pass and heat a propellant fluid using the solar radiation, and creates thrust which comprises:
    (a) a conical section having a large aperture where focused solar radiation can enter the engine,
    (b) attached to the small aperture end of the conical section, a paraboloid solar concentrator having an inner reflective paraboloid surface which can reflect and further focus incoming solar radiation within the cavity, the paraboloid solar concentrator having its largest aperture at the end attached to the conical section, (c) attached to the small aperture end of the paraboloid solar concentrator, an ogive solar collection cavity with concave inner and outer walls having therebetween a heat exchange medium which can pass and heat a propellant fluid, having its highest temperatures deep within the cavity, and (d) a nozzle attached to and communicating with the heat exchange medium of the ogive solar collection cavity, through which the heated propellant fluid can be passed to create thrust, wherein the inner wall of the solar collection cavity and the paraboloid solar concentrator can be regeneratively cooled by propellant.

5. A solar thermal propulsion engine as claimed in claim 4. wherein the ogive solar collection cavity, the paraboloid solar concentrator and the conical section have inner and outer walls having therebetween a single-pass, open cell foam heat exchange medium through which the propellant can pass with turbulence, wherein solar radiation can heat the inner wall of the ogive solar collection cavity, the paraboloid solar concentrator and the solar collection cavity, and the open cell foam heat exchange medium to, in turn, heat the propellant, and wherein the inner wall of the solar collection cavity, the paroboloid solar concentrator and the conical section can be regeneratively cooled by the propellant.

6. A solar thermal propulsion engine as claimed in claim 5 having an annular manifold on the solar radiation receiving side of the conical section through which the propellant can enter the engine and be evenly distributed about all azimuths of the conical section.

7. A solar thermal propulsion engine as claimed in claim 2 wherein the foam is selected from the group consisting of reticulated vitreous carbon foam, hafnium carbide foam, zirconium carbide foam or tantalum carbide foam.

8. A solar thermal propulsion engine as claimed in claim 7 wherein the foam is coated with rhenium, and the inner and outer walls are rhenium.

9. A solar thermal propulsion engine as claimed in claim 2 wherein the foam is reticulated vitreous carbon foam coated with rhenium, hafnium carbide or zirconium carbide, and the inner and outer walls are made of rhenium, hafnium carbide or zirconium carbide.

10. A solar thermal propulsion engine as claimed in claim 6 wherein the foam is selected from the group consisting of reticulated vitreous carbon foam, hafnium carbide foam, zirconium carbide foam or tantalum carbide foam.

11. A solar thermal propulsion engine as claimed in claim 10 wherein the foam is coated with rhenium, and the inner and outer walls are rhenium.

12. A solar thermal propulsion engine as claimed in claim 6 wherein the foam is reticulated vitreous carbon foam coated with rhenium, hafnium carbide or zirconium carbide, and the inner and outer walls are made of rhenium, hafnium carbide or zirconium carbide.

13. A solar thermal propulsion engine as claimed in claim 11. further comprising solar collection and focusing means, insulation, radiation shields, support structure and means for preventing sublimation of the inside and outside walls of the ogive cavity.

14. A solar thermal propulsion engine which comprises:

(a) a heat exchanger having a geometry such that it has inner and outer walls having therebetween an open cell foam heat exchange medium through which a propellant can pass with turbulence, wherein solar radiation can heat the inner wall and the open cell foam heat exchange medium to, in turn, heat the propellant, and (b) a nozzle attached to and communicating with the open cell foam heat exchange medium through which the heated propellant fluid can be passed to create trust, 15. A solar thermal propulsion engine as claimed in claim 14 wherein the foam is selected from the group consisting of reticulated vitreous carbon foam, hafnium carbide foam, zirconium carbide foam or tantalum carbide foam.

16. A solar thermal propulsion engine as claimed in claim 15 wherein the foam is coated with rhenium, and the inner and outer walls are rhenium.

17. A solar thermal propulsion engine as claimed in claim 14 wherein the foam is reticulated vitreous carbon foam and the foam is coated with rhenium, hafnium carbide or zirconium carbide, and the inner and outer walls are made of rhenium, hafnium carbide or zirconium carbide.

18. A solar thermal propulsion engine as claimed in claim 14 wherein the heat exchanger is a single pass heat exchanger.

19. A solar thermal propulsion engine as claimed in claim 18 wherein the inner wall can be regeneratively cooled by the propellant.

20. A solar thermal propulsion engine as claimed in claim 17 wherein the heat exchanger is a single pass heat exchanger and the inner wall can be regeneratively cooled by the propellant.

* * * * *

UNITED STATES PATENT AND TRADEMARK OFFICE
CERTIFICATE OF CORRECTION

PATENT NO. : 5,138,832
DATED : August 18, 1992
INVENTOR(S) : John B. Pande Page 1 of 2

It is certified that error appears in the above-identified patent and that said Letters Patent is hereby corrected as shown below:

On the cover sheet in the Abstract, at line 11, "comprises. (a)" should read "comprises: (a)";

Also in the Abstract, at line 15, "tubulence" should read "turbulence";

Col. 2, line 28, "studies" should read "studied";

Col. 4, line 1, "solor" should read "solar";

Col. 4, line 38, "form" should read "foam";

Col. 5, line 16, "purpose off" should read "purposes of";

Col. 7, line 34, "oftern" should read "often";

Col. 7, line 37, "cavityu" should read "cavity";

Col. 7, line 50, "altitudee" should read "altitude";

In the Claims, Col. 10, line 10, "claim 11." should read "claim 11"; and

UNITED STATES PATENT AND TRADEMARK OFFICE
CERTIFICATE OF CORRECTION

PATENT NO. : 5,138,832
DATED : August 18, 1992
INVENTOR(S) : John B. Pande It is certified that error appears in the above-identified patent and that said Letters Patent is hereby corrected as shown below:

In the Claims, Col. 10, line 26, "create trust," should read "create thrust.".

Signed and Sealed this

Twenty-fourth Day of August, 1993

Attest:

BRUCE LEHMAN

*Attesting Officer*          *Commissioner of Patents and Trademarks*